US00RE37540E

(19) United States
(12) Reissued Patent
Iannazzi et al.

(10) Patent Number: US RE37,540 E
(45) Date of Reissued Patent: Feb. 5, 2002

(54) TRIM PANEL HAVING INTEGRAL DOOR COVER

(75) Inventors: Peter J. Iannazzi; Thomas G. Parker, both of Hamstead, NH (US)

(73) Assignee: Textron Automotive Company, Dover, NH (US)

(21) Appl. No.: 08/924,617

(22) Filed: Sep. 5, 1997

Related U.S. Patent Documents

Reissue of:
(64) Patent No.: 5,447,328
Issued: Sep. 5, 1995
Appl. No.: 08/251,278
Filed: May 31, 1994

(51) Int. Cl.[7] ..... B60R 21/16
(52) U.S. Cl. ..... 280/728.3; 280/732
(58) Field of Search ..... 280/728.3, 731, 280/732

(56) References Cited

U.S. PATENT DOCUMENTS 4,120,516 A * 10/1978 Takamatsu et al. ..... 280/728.3
4,562,025 A * 12/1985 Gray ..... 264/126
4,610,620 A * 9/1986 Gray ..... 425/434
4,911,471 A * 3/1990 Hirabayashi ..... 280/732
5,131,678 A * 7/1992 Gardner et al. ..... 280/728.3
5,180,187 A * 1/1993 Müllet et al. ..... 280/728.3
5,335,935 A * 8/1994 Proos et al. ..... 280/728.3

FOREIGN PATENT DOCUMENTS

DE 39 04 977 * 1/1990 ..... 280/743
JP 1122753 * 5/1989 ..... 280/743

* cited by examiner

*Primary Examiner*—Kenneth R. Rice
(74) *Attorney, Agent, or Firm*—Reising, Ethington, Barnes, Kisselle. Learman & McCulloch, PC

(57) ABSTRACT

An instrument panel has an integral door cover for concealing a supplemental inflatable restraint system in a vehicle passenger compartment. The door cover includes a flap that is an integral part of a flexible plastic skin of the instrument panel. The plastic skin is cast in a special mold with a raised apexed rib that forms grooves outlining the flap that have a thin tear seam at their bottom.

15 Claims, 3 Drawing Sheets

TRIM PANEL HAVING INTEGRAL DOOR COVER

Matter enclosed in heavy brackets [ ] appears in the original patent but forms no part of this reissue specification; matter printed in italics indicates the additions made by reissue.

BACKGROUND OF THE INVENTION

This invention relates generally to supplemental inflatable restraint systems often referred to as airbag systems. More particularly, this invention relates to a trim panel such as an instrument panel, having an integral door cover for concealing the airbag system in a vehicle passenger compartment.

SUMMARY OF THE INVENTION

U.S. Pat. No. 5,131,678 granted to John A. Gardner, Richard D. Rhodes, Jr. and Everett Hastings Jul. 21, 1992 discloses an air bag door cover that is an integral part of a decorative panel for a steering wheel. The panel comprises an aluminum backing plate, an outer flexible vinyl skin arid an intermediate elastomeric urethane foam layer. The vinyl skin is cast with a rectangular groove that defines a door. The cast vinyl skin is then placed in a mold in a spaced relationship with the backing plate after which the intermediate layer is foamed in place. The bottom of the rectangular groove is then cut at least part way through on three sides to provide a weakened section in the panel that includes an U-shaped cut line in the backing plate.

While the decorative panel of the above patent is well suited for its intended purpose, it has a drawback in that the bottom of the groove is cut at least part way through on three sides after the vinyl skin is cast and assembled into the decorative panel. This cutting in turn requires deep and narrow grooves to hide the cut. These grooves limit aesthetic design choices and may be difficult to form.

The object of this invention is to provide a trim panel that has an integral door cover for an airbag system that does not require cutting the bottom of the grooves.

Another object of this invention is to provide a trim panel that has a shaped plastic skin that includes a flap for an integral door cover for a SIR system that is partially outlined by a groove that does not require any cutting after the skin is cast to provide a weakened tear seam.

Still another object of this invention is to provide a trim panel that has an integral door cover for an airbag system that includes a shaped plastic skin having a flap partially outlined by a groove that is cast in an aesthetically pleasing manner to include a weakened tear seam at its bottom that does not require any cutting after the skin is cast.

Still yet another object of this invention is to provide a method for making such a trim panel and a mold for use in practicing the method.

A feature and advantage of the trim panel of this invention is that the trim panel has a cast plastic skin which includes a flap for an integral door cover that is cast in a special mold that produces a weakened tear seam in the bottom of an aesthetically pleasing groove that does not require any cutting after the skin is cast.

Still another feature and advantage of the invention is that trim panel is cast in a mold that has a raised rib for forming a groove that partially outlines a flap in a cast plastic skin and that includes a tear seam that can be ruptured by a deploying airbag without any need for cutting the tear seam after the plastic skin is cast.

Yet still another feature and advantage of the invention is that it provides a special mold having a uniquely shaped rib for casting a flexible plastic skin so that the cast plastic skin is formed with a groove that partially outlines a flap and that includes a tear seam that can be ruptured by a deploying air bag without any need for cutting the groove.

BRIEF DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE INVENTION

Figure 1:
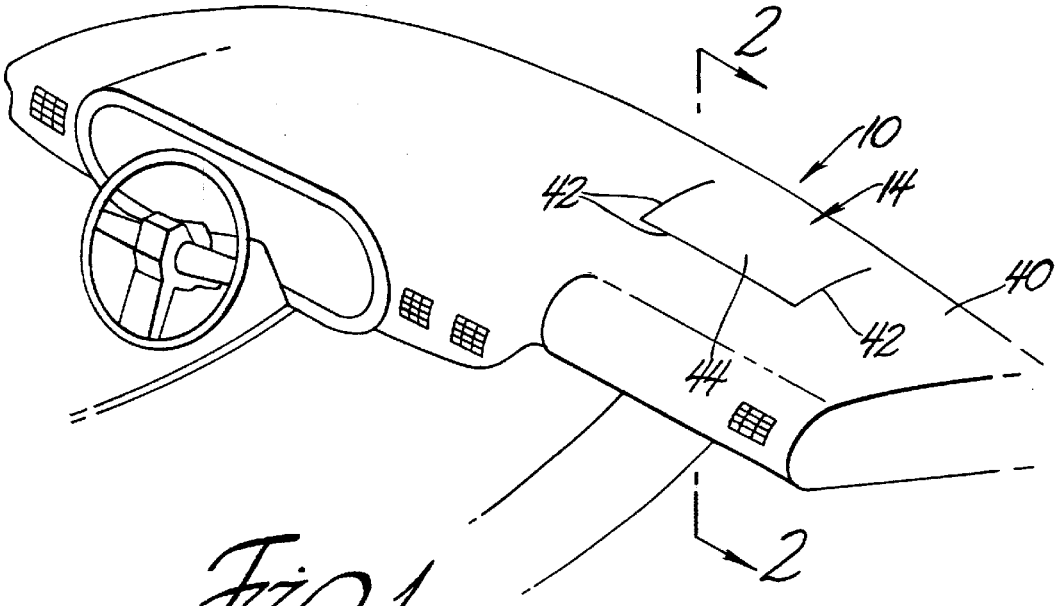
FIG. 1 is a perspective view of an automotive instrument panel that includes an integral door cover made in accordance with this invention.

Referring now to the drawing, FIG. 1 shows an instrument panel 10 having an airbag system 12 located beneath an integral door cover 14 constructed in accordance with this invention. In this particular instance, the airbag restraint system 12 is located beneath the top of the instrument panel on the passenger side of the vehicle. However the integrated door cover of this invention can be used on the driver side as part of a trim panel for the steering wheel; on either side as part of the front or facing portion of the instrument panel; or as part of any other trim panel that is strategically positioned in the passenger compartment.

The airbag system 12 includes an airbag housing 16 that encloses a gas generator 18 for supplying an inflatant to an airbag 20 that is collapsed, folded and packed in the housing 16. The folded airbag 20 includes an inlet end 22 connected to a passage for flow of the inflatant from the gas generator 18 into the airbag. The airbag also includes a nose end 24 at the opposite end of the folds that is positioned to open the door 14 when the airbag 20 inflates.

Figure 2:
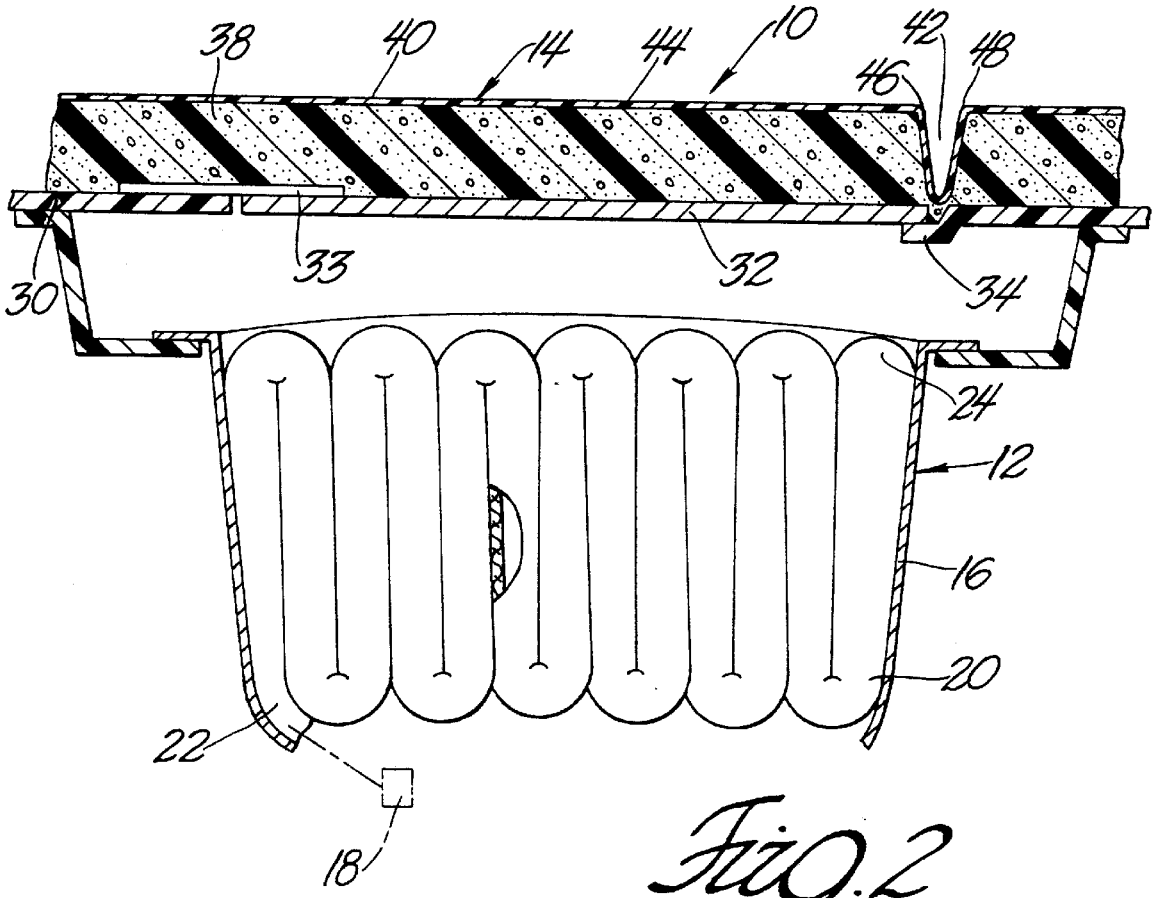
FIG. 2 is a fragmentary sectional view of a first embodiment of the invention taken substantially along the line 2—2 of FIG. 1 looking in the direction of the arrows.
Figure 3:
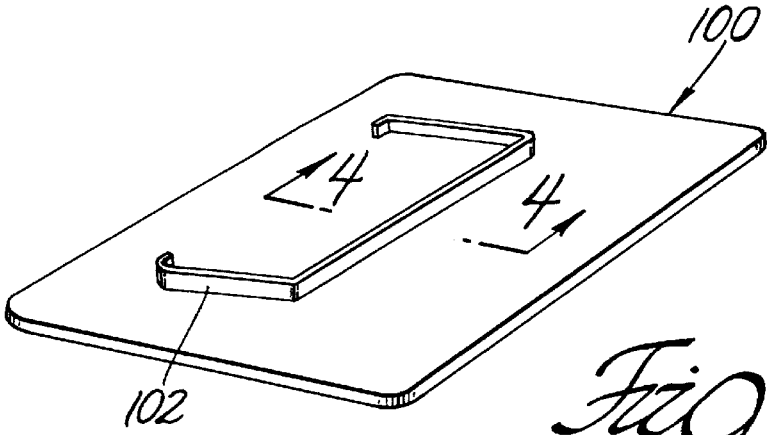
FIG. 3 is a fragmentary perspective view of a special mold for making a cast skin for the automotive instrument panel of FIG. 1 that is made in accordance with this invention.

The instrument panel 10 comprises a substrate or support 30 of structural plastic material such as ABS/Polycarbonate, Polypropylene, Polyphylene Oxide (PPO)/HIPS or Styrene Malaeic Anhydrid (SMA). The substrate 30 has a rectangular opening for deployment of the air bag 20 that is closed by a door back plate or reinforcement 32 of aluminum or other light weight metal. The door back plate 32 is connected to the substrate 30 by a hinge 33 at a back end. The opposite or front end of the door back plate 32 is supported on a depressed lip 34 of the substrate 30 at the front edge of the rectangular opening for the door 14 when the door 14 is in the closed position as shown in FIG. 2.

The airbag housing 16 is supported beneath the door 14 by a depending rectangular plastic bracket that is welded or otherwise suitably secured to the bottom of the substrate 30.

The outer surface of the substrate 30 and the hinged door back plate 32 is bonded to a layer of a suitable energy absorbing elastomeric foam, such as urethane foam that forms a cushion 38 in an underlying relationship to a polymeric skin or shell 40 of vinyl or other suitable flexible plastic material such as thermoplastic urethane (TPU), thermoplastic olefin (TPO) or polyester that forms an outer decorative surface of the instrument panel 10.

The skin 40 has three grooves 42 in a U-shaped pattern that outline a flap 44 that is aligned with front and side edges of the hinged door back plate 32. The grooves 42 are formed to provide tear lines or weakened sections for separating the skin flap 44 as explained below. The grooves 42 are also formed so that there are not any cuts needed in the bottom of the grooves. Consequently, the uncut grooves 42 also improve the aesthetic appearance of the instrument panel 10 as explained below.

Referring now to FIGS. 3 through 6, the polymeric skin 40 may be made for example by a drysol casting process such as that disclosed in U.S. Pat. Nos. 4,562,025 and 4,610,620 granted to John D. Gray Dec. 31, 1985 and Sep. 9, 1986 respectively. These patents are hereby incorporated in this patent specification by reference. Other examples of processes or methods for shaping the polymeric skin include rotational casting, liquid casting, blow molding and vacuum forming. In any event, the vinyl skin 40 is cast using a special mold 100 that produces the three grooves 42 in the U-shaped pattern that defines the skin flap 44 for the door cover 14 that opens when the airbag 20 is deployed.

Figure 4:
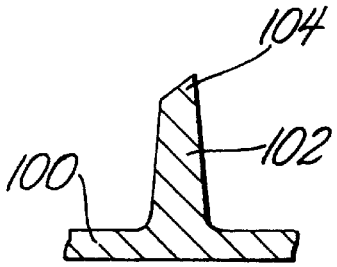
FIG. 4 is a section of the mold taken substantially along the line 4—4 of FIG. 3 looking in the direction of the arrows.
Figure 6:
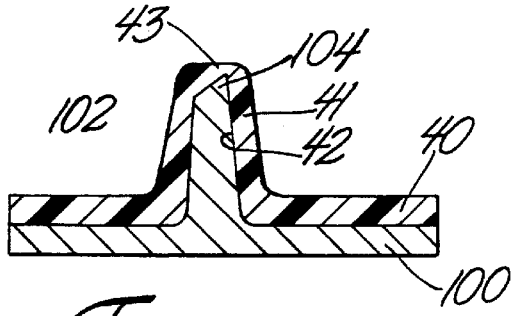
FIG. 6 is a section taken substantially along the line 6—6 of FIG. 5 looking in the direction of the arrows.
Figure 5:
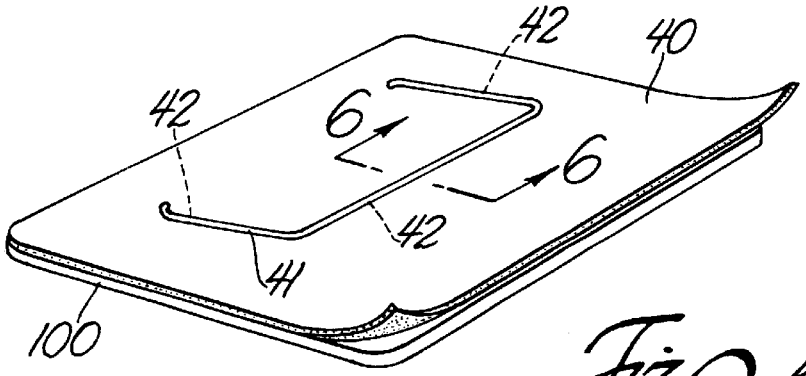
FIG. 5 is a fragmentary perspective view of the mold of FIG. 3 showing the skin cast in place on the mold.

FIG. 4 shows a portion of the special mold 100 for casting the vinyl skin 40 which is preferably cast using a drysol casting process such as that described in the two U.S. Patents that are identified above and that are incorporated in this patent specification by reference. More particularly, FIG. 4 shows the portion of the mold 100 for casting the portion of the vinyl skin 40 that includes the integral flap 44. This portion of the mold 100 has a raised narrow rib 102 in a U-shaped pattern. The top of the narrow rib 102 is slanted to provide a V-like apex 104 as shown in FIG. 4. When the skin 40 is cast in the mold 100 in a drysol casting operation, the casting material thins out over the top of the raised narrow rib 102 of the mold 100 and a very thin section is formed at the apex 104 of the rib 102. FIGS. 5 and 6 show a fragmentary portion of the vinyl skin 40 after it has been cast in the mold 100. The cast vinyl skin 40 has a depending portion 41 in a U-shaped pattern that is formed by the raised rib 102 of the mold 100 and that contains the groove 42. The groove 42 has a bottom which includes a very thin section 43 that forms over the apex 104 of the raised rib 102 as shown in FIG. 6. The thin section 43 is considerably thinner than the rest of the cast skin 40 and can have a thickness that is as little as 25% of the predominate or nominal thickness of the cast skin 40.

This thin section provides a tear seam in the bottom of the groove 42 without any need for cutting after the skin 40 is cast. Since there is no need to hide the bottom of the groove 42, the groove may be relatively shallow as shown in FIG. 2 where the depth to width ratio is about 2 to 1. The possibility of shallower grooves provides the designer with a wider range for style lines and the manufacturer with an easier manufacturing job.

A general criterion for a tear seam is that the tear seam should have a tensile strength of no more than about 50% of the tensile strength of the rest of the skin. Consequently, a suitable tear seam can be provided with a thin section at the bottom of the groove 42 that has a thickness that is as much as about 50% of that of the rest of the skin. Of course the precise thickness required will vary somewhat with the skin material selected and customer requirements for the tensile strength of the tear seam. However, the formulation of the selected skin material and the shape of the groove 42 and the raised rib 102 can be varied to produce the desired thickness of the tear seam by the thinning of the skin material on the raised rib 102 during the casting process.

To manufacture instrument panel 10, the vinyl skin 40 with the flap 44 outlined by the groove 42 shown in FIGS. 5 and 6 is demolded and placed in the cavity of a conventional closeable mold that has a cavity that is shaped to correspond to the desired shape of the instrument panel 10. The substrate 30 and hinged door reinforcement 32 are then placed in a spaced relationship in the closed mold and the intermediate elastomeric layer 38 is then foamed in place in a conventional manner to provide the instrument panel 10 that is partially shown in section in FIG. 2.

Figure 7:
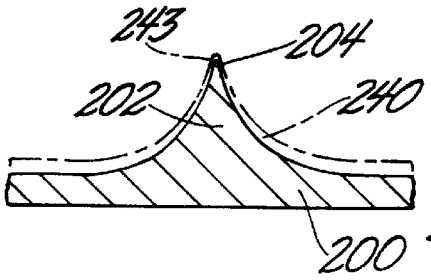
FIG. 7 is a section of an alternative mold for making a cast skin for an alternative automotive instrument panel that is made in accordance with this invention and showing the skin cast in place on the mold in phantom.
Figure 8:
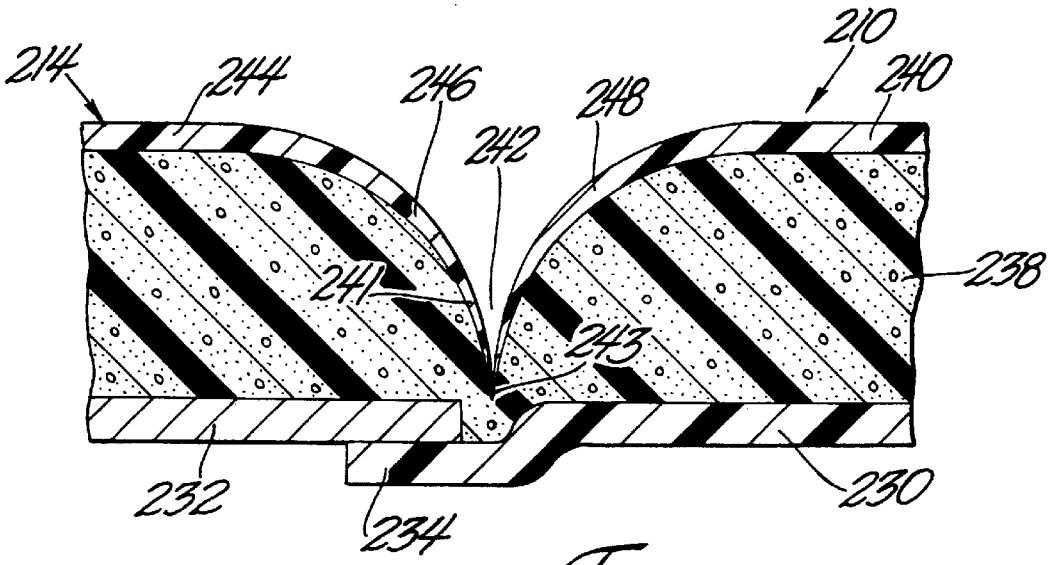
FIG. 8 is an enlarged fragmentary sectional view similar to FIG. 2 showing the cast skin of FIG. 7 incorporated in the alternative automotive instrument panel.

Referring now to FIGS. 7 and 8, FIG. 7 shows a section of an alternative mold 200 for making a cast skin 240 for an alternative automotive instrument panel 210 that is partially shown in FIG. 8 and that is also made in accordance with this invention. More particularly, FIG. 7 shows the section of the mold 200 for casting the portion of the vinyl skin 240 that contains a U-shaped groove 242 that outlines an integral flap 244 of the door cover 214. This portion of the mold 200 has a raised narrow rib 202 in a U-shaped pattern. The narrow rib 202 has concave side walls to provide a cusp-like apex 204 at the top of the rib 202. When the skin 240 is cast in the mold 200 in a drysol casting operation, the casting material progressively thins out over raised narrow rib 202 of the mold 200 and a very thin section is formed at the cusp-like apex 204 of the rib 202. FIG. 7 shows a fragmentary portion of the vinyl skin 240 in phantom after it has been cast in the mold 200. The cast vinyl skin 240 has a depending portion 241 in a U-shaped pattern that is formed by the raised rib 202 of the tool 200 and that contains the groove 242. The groove 242 has a bottom which includes a very thin section 243 that forms over the cusp-like apex 204 of the raised rib 202 as shown in FIG. 7.

To manufacture instrument panel 210, the vinyl skin 240 with the flap 244 outlined by the groove 242 shown in FIG. 7 is demolded and placed in the cavity of a conventional closeable mold that has a cavity that is shaped to correspond to the desired shape of the instrument panel 210. The substrate 230 and hinged door reinforcement 232 are then placed in a spaced relationship in the closed mold and the intermediate elastomeric layer 238 is then foamed in place in a conventional manner to provide the instrument panel 210 that is partially shown in section in FIG. 8. The groove 242 is in the nature of a "gull wing" shaped style line that is formed with a converging gap between rounded edges 246 of the integral flap and adjacent rounded edges 248 of the vinyl skin 240 at the surface of the instrument panel 210. However, the groove 242 is still formed with a very thin section 243 at the bottom that provides a tear line or weakened section for separating the flap 244 that eliminates any need for cutting the skin 240 after it is cast. Thus the invention provides a wide range of aesthetic alternatives for the designer.

Aside from the differences noted above, the instrument panel 210 is otherwise the same as the instrument panel 10 and corresponding parts are identified by adding 200 to the identifying numerals for the parts of instrument panel 10.

Figure 9:
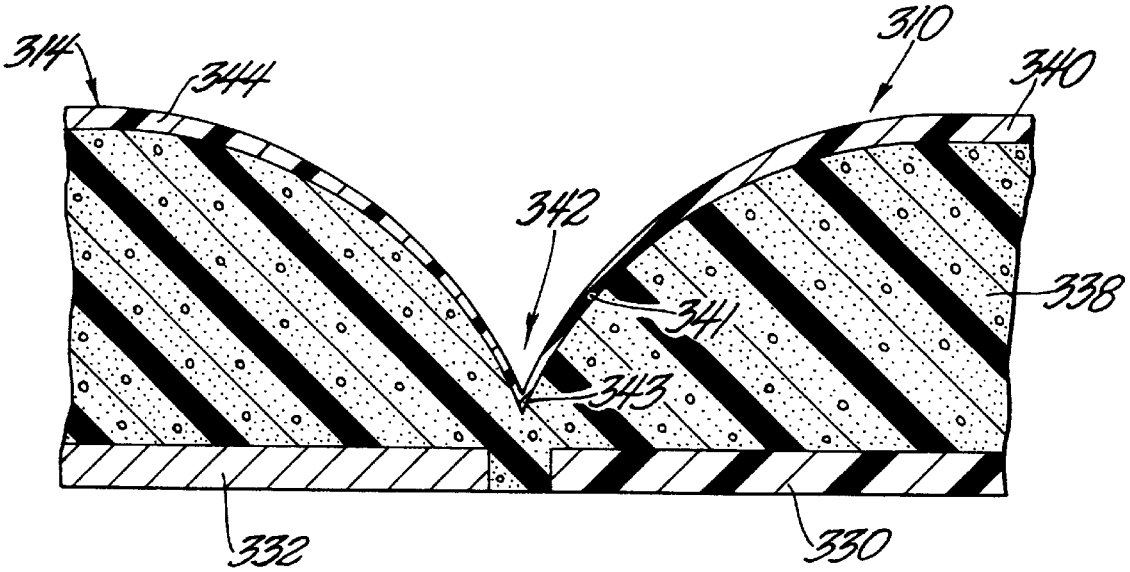
FIG. 9 is an enlarged fragmentary sectional view similar to FIG. 2 showing another alternative automotive instrument panel.

Another alternative instrument panel 310 is shown in FIG. 9. This instrument panel 310 is characterized by a groove 342 that provides a wider "gull wing" style line that outlines the flap 344 of the door cover 314 in the skin 340. The skin 340 is cast in a mold similar to that shown in FIG. 7 so that the depending portion 341 of the skin 340 that defines the groove 342 progressively thins out to a very thin section 343 at the bottom that provides a weakened section or tear line without any need for cutting. The substrate 330 also does not have a support lip for the front end of the door back plate 332 which is characteristic of small doors or dual door arrangements. The instrument panel 310 is otherwise the same as the instrument panel 210.

An advantage of these "gull wing" style lines is that they are generally regarded as more aesthetically pleasing and easier to tool.

All of the foregoing instrument panels operate in the same manner. When the gas generator 18 is triggered due to a predetermined vehicle deceleration, the airbag 20 inflates at the nose end 24 first and then progressively back toward the inlet end 22. Consequently the nose end 24 engages the metal door reinforcement 32, 232 or 332 and pivots it outwardly about hinge 32. As the door pivots outwardly, the foam layer 38, 238 or 338 and then the skin 40, 240 or 340 is fractured at the weakened sections or tear lines to create a separated flap 44, 244 or 344 and an opening for deployment of the airbag 20 that corresponds with the rectangular opening in the substrate 30, 230 or 330.

While a U-shaped pattern of three grooves has been described for purposes of illustration, other arrangements are possible. For instance, four grooves or an H-shaped or X-shaped pattern may be used. In other words, the invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A trim panel having a door cover for concealing an airbag system in a vehicle passenger compartment and a flexible plastic skin that includes a flap that is an integral part of the door cover comprising:

the flexible plastic skin having a depending portion that contains a groove for providing a tear seam between the flap and the remaining part of the polymeric skin, a layer of energy absorbing elastomeric foam underlying the plastic skin, and the groove being formed so that it has a weakened section in the layer of energy absorbing elastomeric foam that can be fractured by deployment of an airbag without any need for cutting the groove.

2. The trim panel as defined in claim 1 wherein the flexible plastic skin is cast in a mold having a raised rib that forms the groove so that it has a thinner section at its bottom.

3. The trim panel as defined in claim 2 wherein the flexible plastic skin is cast in a mold having a raised rib that forms the groove so that the groove is gull wing shaped.

4. The trim panel as defined in claim 1 wherein the flexible plastic skin is cast in a mold with a raised rib so that the groove has a bottom that includes a thin section that provides a tear seam that can be fractured by deployment of an air bag without any need for cutting the plastic skin after it is cast.

5. The trim panel as defined in claim 1 wherein the thin section has a thickness that is in the range of about 25% to 50% of the nominal thickness of the remainder of the skin.

6. A method for making a trim panel having a door cover for concealing an airbag system in a vehicle passenger compartment and a flexible plastic skin that includes a flap that is an integral part of the door cover comprising:

casting a flexible plastic skin in a mold that has a raised rib so that the skin has a depending portion that contains a groove that conforms to the shape of the raised rib, and the raised rib having a top that has an apex so that the groove is formed with a bottom that is cast with a thin section that forms over the apex to provide a tear seam for the skin flap that can be fractured by deployment of an airbag without any need for cutting the bottom of the groove.

7. The method for making a trim panel as defined in claim 6 further comprising:

placing the cast skin in a closeable mold, and foaming an elastomeric layer in place beneath the polymeric skin so that the depending portion is disposed in the layer generated in the foaming process.

8. The method for making a trim panel as defined in claim 6 wherein the top of the raised rib has a V-like apex.

9. The method for making a trim panel as defined in claim 6 wherein the raised rib has concave sides that provide a cusp-like apex at the top of the raised rib.

10. A mold for casting a flexible plastic skin for a trim panel having a door cover for concealing an airbag system in a vehicle passenger compartment wherein the flexible plastic skin includes a flap that is an integral part of the door cover, the mold comprising:

a raised rib that forms a depending portion in the flexible plastic skin that contains a groove that conforms to the shape of the raised rib when the flexible plastic skin is cast in the mold, and the raised rib having a top that has an apex so that the groove is formed with a bottom that is cast with a thin section that forms over the apex to provide a tear seam for the flap that can be fractured by deployment of an airbag without any need for cutting the bottom of the groove.

11. The mold for making a trim panel as defined in claim 10 wherein the raised rib has a height to width ratio of about 2 to 1.

12. The mold for making a trim panel as defined in claim 10 wherein the top of the raised rib has a V-like apex.

13. The mold for making a trim panel as defined in claim 10 wherein the raised rib has concave sides that provide a cusp-like apex at the top of the raised rib.

*14. A method for making a trim panel having a door cover for concealing an airbag system in a vehicle passenger compartment and a flexible plastic skin that includes a flap that is an integral part of the door cover comprising:*

*casting a flexible plastic skin in a mold that has a raised rib so that the skin contains a groove that conforms to the shape of the raised rib,*

*the raised rib having a top so that the groove is formed with a bottom with a thin section to provide a tear seam for the skin flap that can be fractured by deployment of an airbag without any need for weakening the bottom of the groove;*

*placing the cast skin in a closable mold; and*

*foaming an elastomeric layer in place beneath the plastic skin.*

*15. A method for making a trim panel having a door cover for concealing an airbag system in a vehicle passenger compartment and a flexible plastic skin that includes a flap that is an integral part of the door cover comprising:*

*forming a flexible plastic skin in a mold that has a raised rib so that the skin contains a groove that conforms to the shape of the raised rib,*

*the raised rib having a top so that the groove is formed with a bottom with a thin section to provide a tear seam for the skin flap that can be fractured by deployment of an airbag without any need for weakening the bottom of the groove; and*

*forming a foam layer beneath the plastic skin.*

* * * * *